US012603235B2

(12) United States Patent
Hammer et al.

(10) Patent No.: US 12,603,235 B2
(45) Date of Patent: Apr. 14, 2026

(54) SWITCH ASSEMBLY COMPRISING AN ON-LOAD TAP CHANGER AND A DRIVE SYSTEM

(71) Applicant: Maschinenfabrik Reinhausen GmbH, Regensburg (DE)

(72) Inventors: Christian Hammer, Regensburg (DE); Dominik Plitzko, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 212 days.

(21) Appl. No.: 18/260,788

(22) PCT Filed: Dec. 21, 2021

(86) PCT No.: PCT/EP2021/086956
§ 371 (c)(1),
(2) Date: Jul. 10, 2023

(87) PCT Pub. No.: WO2022/156982
PCT Pub. Date: Jul. 28, 2022

(65) Prior Publication Data

US 2024/0062970 A1 Feb. 22, 2024

(30) Foreign Application Priority Data

Jan. 21, 2021 (DE) ..................... 10 2021 101 237.6

(51) Int. Cl.
*H01H 9/00* (2006.01)

(52) U.S. Cl.
CPC ... *H01H 9/0027* (2013.01); *H01H 2009/0061* (2013.01)

(58) Field of Classification Search
CPC ......... H01H 9/0027; H01H 2009/0061; H01H 3/00; H01H 3/02; H01H 3/22; H01H 3/26; H01H 2003/266; H01H 1/56; H01H 15/08; H01H 19/12; H01H 21/20; H01H 2009/00; H01H 2009/0005; H01H 2009/0044;
(Continued)

(56) References Cited

U.S. PATENT DOCUMENTS

2010/0207599 A1* 8/2010 Blomquist ........... H01H 9/0027
323/355
2015/0035538 A1 2/2015 Bieringer et al.
(Continued)

FOREIGN PATENT DOCUMENTS

DE 4433973 A1 3/1996
DE 102012103736 A1 10/2013
(Continued)

*Primary Examiner* — Anthony R Jimenez
(74) *Attorney, Agent, or Firm* — LEYDIG, VOIT & MAYER, LTD.

(57) ABSTRACT

A switch assembly has an on-load tap changer and a drive system for the on-load tap changer. The drive system has: a stepper motor having a motor shaft, the motor shaft being connected to and configured to actuate the on-load tap changer; a feedback system, which is configured: to determine at least one value for a position of the motor shaft; and to generate a feedback signal based on the at least one value; and a control device, which is configured to influence the operation of the switch assembly depending on the feedback signal.

8 Claims, 2 Drawing Sheets

(58) Field of Classification Search
CPC .. H01H 2009/34; H01H 2009/02; H01H 9/00; H01H 9/0005; H01H 9/0066; H01H 9/0044; H01H 9/02; H01H 9/34
USPC ........................................................ 200/11 TC
See application file for complete search history.

(56) References Cited

U.S. PATENT DOCUMENTS

| | | | | |
|---|---|---|---|---|
| 2015/0171783 | A1 * | 6/2015 | Kammerl | H01H 9/0027<br>336/150 |
| 2022/0216013 | A1 | 7/2022 | Dittmann et al. | |
| 2022/0223356 | A1 | 7/2022 | Pruessing et al. | |
| 2022/0262581 | A1 * | 8/2022 | Schmid | H01H 3/26 |

FOREIGN PATENT DOCUMENTS

| | | | |
|---|---|---|---|
| DE | 102012105152 | A1 | 12/2013 |
| DE | 102019112712 | A1 | 11/2020 |
| DE | 102019112717 | A1 | 11/2020 |
| EP | 2054902 | A1 | 5/2009 |
| EP | 2691967 | B1 | 3/2017 |
| RU | 2444046 | C1 * | 2/2012 |
| WO | WO 2020229130 | A1 | 11/2020 |

* cited by examiner

SWITCH ASSEMBLY COMPRISING AN ON-LOAD TAP CHANGER AND A DRIVE SYSTEM

CROSS REFERENCE TO RELATED APPLICATIONS

This application is a U.S. National Phase application under 35 U.S.C. § 371 of International Application No. PCT/EP2021/086956, filed on Dec. 21, 2021, and claims benefit to German Patent Application No. DE 10 2021 101 237.6, filed on Jan. 21, 2021. The International Application was published in German on Jul. 28, 2022 as WO 2022/156982 A1 under PCT Article 21(2).

FIELD

The present disclosure relates to a switch assembly comprising an on-load tap changer and a drive system for the on-load tap changer.

BACKGROUND

On-load tap changers in step transformers are actuated using various means. Here, using motors allows the on-load tap changers to be actuated easily. It is however always necessary to monitor such motors, because they constitute a highly safety-relevant component. This applies in particular to the switching operation, because this takes place whilst the step transformer is in operation. In extreme cases, malfunctions during operation can have serious technical and economic consequences.

SUMMARY

In an embodiment, the present disclosure provides a switch assembly having an on-load tap changer and a drive system for the on-load tap changer. The drive system has: a stepper motor having a motor shaft, the motor shaft being connected to and configured to actuate the on-load tap changer; a feedback system, which is configured: to determine at least one value for a position of the motor shaft; and to generate a feedback signal based on the at least one value; and a control device, which is configured to influence the operation of the switch assembly depending on the feedback signal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
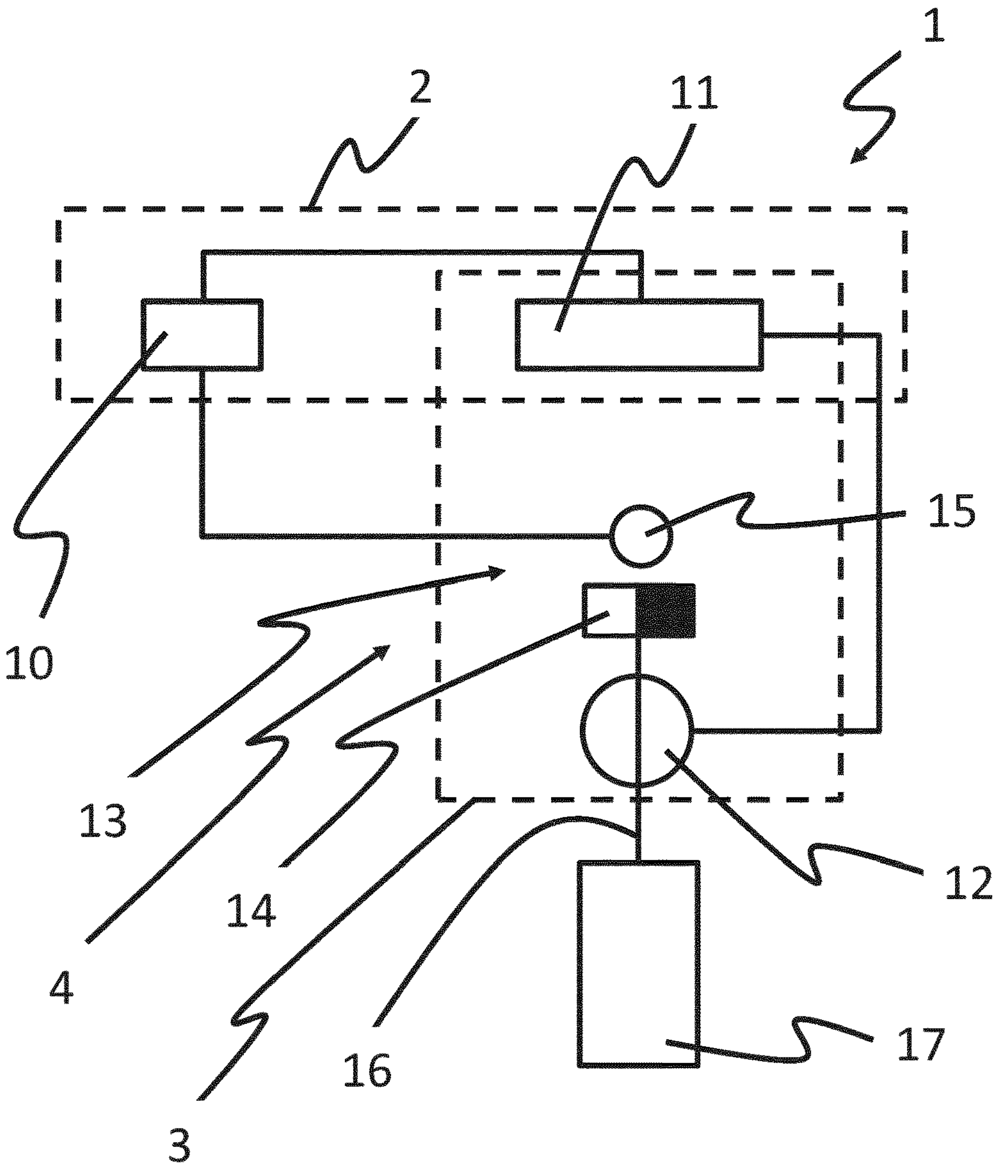
FIG. 1 is a schematic illustration of an exemplary embodiment of a switch assembly according to the improved concept.

Aspects of the present disclosure provide an improved concept for driving an on-load tap changer, which increases operational reliability.

An aspect of the present disclosure provides a switch assembly, comprising an on-load tap changer and a drive system for the on-load tap changer, the drive system comprising:

- a stepper motor having a motor shaft, wherein the motor shaft is connected to the on-load tap changer;
- a feedback system, which is designed:
  - to determine at least one value for a position of the motor shaft; and
  - to generate a feedback signal based on the at least one value; and
- a control device which is configured to influence the operation of the switch assembly depending on the feedback signal.

The improved concept is based on the idea of equipping the motor shaft of a stepper motor for driving an on-load tap changer with a feedback system, which is able to detect a value for a position of the motor shaft. Here, the feedback system is able to interrogate the position of the motor shaft after or during a switching operation and to make this available for checking. For this purpose, a feedback signal that is based on the position of the motor shaft is generated.

Thus, while the stepper motor is actuated by a control device, the feedback system determines the actual position of the motor shaft, and thus, of the on-load tap changer. The feedback system has a magnet and a Hall sensor, which are spatially separate from one another. This means that malfunctions originating from the on-load tap changer have no influence on the Hall sensor. The implementation of the feedback system with a magnet and a Hall sensor is particularly inexpensive and nevertheless very reliable.

The control device has a control unit with a motor driver. The control unit is connected to the motor driver and transmits to the latter to what extent and at what speed the stepper motor or the motor shaft thereof should rotate in order to thereby actuate the on-load tap changer. After the stepper motor has been actuated, the feedback system transmits the position of the motor shaft to the control unit by way of the feedback signal. If the position to which the stepper motor is to be moved, or the position of the motor shaft, does not correspond to the position determined by the feedback system, the switch assembly is shut down or moved into a safe position. A shutdown refers to a complete deactivation of the on-load tap changer. As a safe setting/position is moved to or assumed, the stepper motor, and thus the on-load tap changer, are actuated again. It is sought here to move to a particular winding tap in the selector. Thus, inter alia, the shutdown or the movement to or assumption of a safe position is to be regarded as influencing of the operation of the switch assembly by the control device within the meaning of the present disclosure.

According to at least one embodiment, the feedback system comprises a magnet and a Hall sensor, by means of which the value for the position of the motor shaft is determined. Here, the Hall sensor can determine the angle by which the magnet, and thus, the motor shaft have rotated; this is the feedback signal. Furthermore, by means of the Hall sensor, it is possible to determine the time in which the magnet and the motor shaft have rotated. This information may likewise be included in the feedback signal.

It may be provided that:

- the magnet is arranged on the motor shaft;
- the Hall sensor is arranged in the immediate vicinity of the magnet;
- the magnet is arranged at a first end of the motor shaft;

the motor shaft is connected, at a second end that is situated opposite the first end, to the on-load tap changer.

The Hall sensor and the magnet may always be arranged such that the Hall sensor can detect the varying position or setting of the magnet.

It may furthermore be provided that:

a housing having a partition is provided;

the partition separates a first region from a second region in the housing;

the stepper motor having the motor shaft and the magnet is arranged in the first region, and the Hall sensor is arranged in the second region.

The housing of the switch assembly is preferably formed from an electrically insulating material such as plastics or glass fiber reinforced plastics. The partition separates the regions from one another.

It may furthermore be provided that:

the control device has a motor driver and a control unit;

the motor driver and the control unit are configured to control the stepper motor and thereby actuate the motor shaft.

The control is implemented by virtue of the control unit transmitting to the motor driver at what speed and by how many units the stepper motor should rotate. Depending on the embodiment, a rotation of the drive shaft through 360° may be divided into 200, 400, 600 or 800 steps.

It may furthermore be provided that:

the feedback system is connected to the control device, in particular to the control unit.

It may furthermore be provided that:

when influencing the switch assembly, the control device does so by shutting down or deactivating same.

It may furthermore be provided that:

when influencing the switch assembly, the control device does so by actuating same again such that the on-load tap changer assumes or moves to a safe position or setting.

It may furthermore be provided that:

the safe position or setting of the on-load tap changer corresponds to a position or setting of a selector of the on-load tap changer.

The expression “values for the position of the motor shaft” also includes those values of measurement variables from which the position of the motor shaft can be unambiguously determined, if necessary within a tolerance range.

By determining a value for the position of the motor shaft, the control device can carry out a plausibility check of the position determination or a reconciliation of the value, and can thereby increase safety and influence the operation of the switch assembly.

According to at least one embodiment, the drive system serves to drive a shaft of the on-load tap-changer. This for example causes the on-load tap-changer to carry out one or more operations, for example a switchover between two winding taps of an item of equipment or parts of the switchover, such as a diverter switch operation, a selector actuation or a change-over selector actuation.

The motor shaft is connected directly or indirectly, in particular via one or more gear units, to the on-load tap-changer, in particular to the shaft of the on-load tap-changer.

According to at least one embodiment, the motor shaft is connected directly or indirectly to the magnet.

According to at least one embodiment, a position, in particular an absolute position, of the motor shaft corresponds to a position, in particular a relative or absolute position, of the on-load tap changer. This means that the position of the on-load tap changer can be unambiguously deduced from the position of the motor shaft, if necessary within a tolerance range.

According to at least one embodiment, the influence or the influencing of operation includes open-loop control, closed-loop control, braking, acceleration, or stopping of the motor.

According to at least one embodiment, the control device comprises a control unit and a motor driver for an open-loop-controlled or closed-loop-controlled supply of energy to the stepper motor.

The position of the motor shaft may for example be compared, by the control device, with the position to which the stepper motor is to be moved. In the event of a significant deviation, the control device can output a fault notification or influence the switch assembly.

According to at least one embodiment, the magnet is interlockingly connected to the motor shaft. According to at least one further embodiment, the magnet is additionally connected to the motor shaft in a frictionally engaged or integrally bonded manner, for example by means of an adhesive connection.

The interlocked and additional integrally bonded or frictionally engaged connection further increases the attachment of the magnet and ultimately the operational reliability.

FIG. 1 is a schematic illustration of an exemplary embodiment of a switch assembly 1 according to the improved concept, having an on-load tap changer 17 and a drive system 3, which is connected to the on-load tap changer 17 via a motor shaft 16. The on-load tap changer 17 may be configured as an on-load tap changer with a diverter switch, selector, double reversing change-over selector, reversing change-over selector and/or change-over selector. Here, the diverter switch of the on-load tap changer 17 may have mechanical main switching contacts, vacuum interrupters or semiconductor switching elements. Furthermore, the on-load tap changer 17 may be configured as a hybrid on-load tap changer, which then has both mechanical switching contacts and semiconductor switch contacts in the diverter switch. The selector of a hybrid on-load tap changer has mechanical switching contacts.

The drive system 3 comprises a stepper motor 12 with a motor shaft 16. A control device 2 of the drive system 3 comprises a motor driver 11 for an open-loop-controlled or closed-loop-controlled supply of energy to the stepper motor 12 and comprises a control unit 10 for controlling the motor driver 11. The motor driver 11 may be configured as a power section or frequency converter.

The drive system 3 comprises an encoder system 13, which serves as a feedback system 4 or is part of the feedback system 4 and is connected to the control unit 10. Furthermore, the encoder system 13 is in part coupled directly or indirectly to the motor shaft 16.

The encoder system 13 is configured to detect a value for a position, in particular an angular position, for example a relative or absolute angular position, of the motor shaft 16. For this purpose, the encoder system 13 comprises a magnet 14 and a Hall sensor 15, wherein the magnet 14 is fastened to the motor shaft 16, which is in an explicitly defined position in relation to the Hall sensor 15.

The fastening of the magnet 14 to the motor shaft 16 is embodied, for example, as a combination of an interlocked connection with a frictionally engaged and/or integrally bonded connection.

The drive system 3 and in particular the control device 2, in particular the control unit (controller) 10 and/or the motor driver 11, is furthermore configured to perform open-loop and closed-loop control of the stepper motor. Here, the control unit 10 transmits to the motor driver 11 at what speed and to what extent the stepper motor 12, or the motor shaft 16 thereof, should move or rotate. This is done with the aid of rings of soft iron teeth in the interior of the stepper motor, which are comprised by the electromagnets of the stator and the permanent magnets of the rotor. These make it possible for the motor shaft 16 of the stepper motor 12 to perform a corresponding stepped movement. The steps may additionally be subdivided through suitable electronic actuation of the stator windings. For example, the stepper motor 12 may subdivide a rotation of the motor shaft through 360° into 200, 400 or 800 steps.

The control device 2, and in particular the control unit 10 of the drive system 3, uses the feedback system 4 to compare the actual position of the motor shaft 16 with the position to which the stepper motor 12 should have moved.

The feedback system 4 thus forms a type of safety device which checks whether the stepper motor 12 has actually moved to the correct position.

If not, this is identified as a malfunction of the drive system, and the on-load tap changer 17 is moved into a safe position/setting and/or is shut down.

Figure 2:
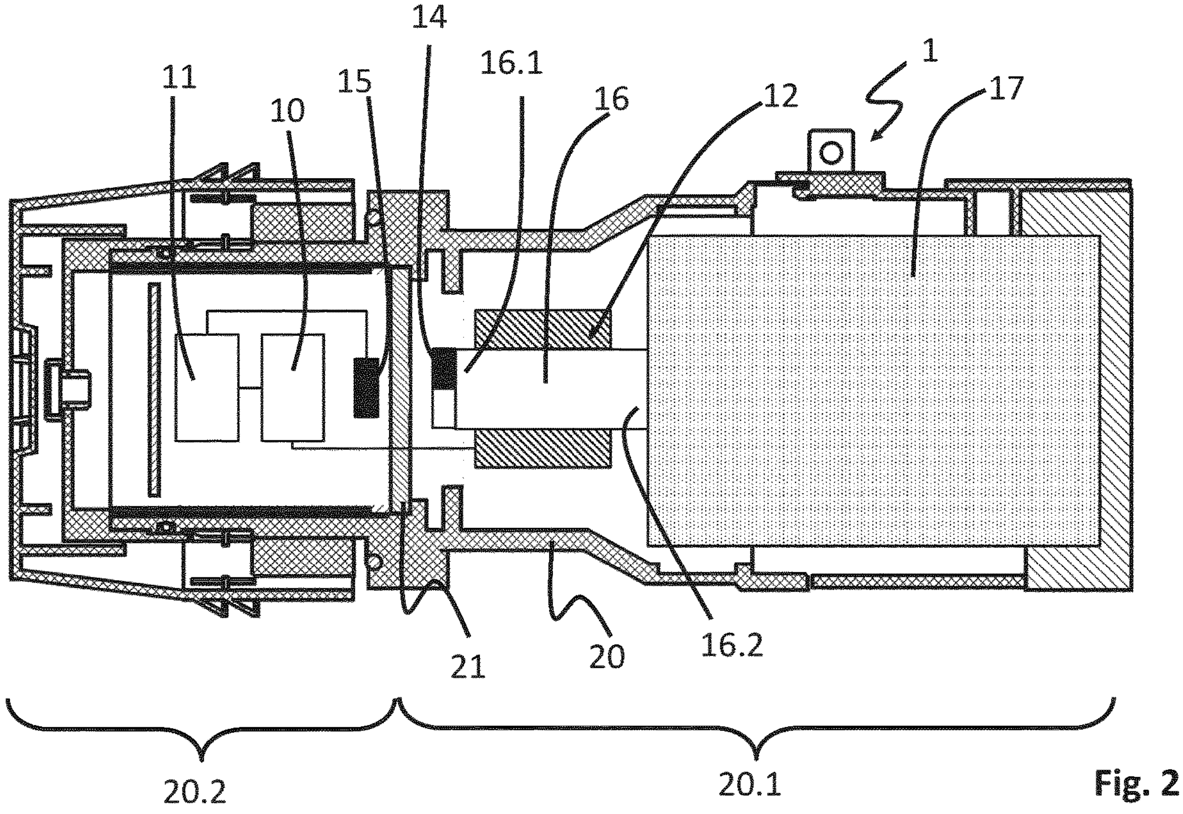
FIG. 2 shows a design embodiment of a switch assembly according to the improved concept.

FIG. 2 shows a possible design embodiment or arrangement of the switch assembly 1 according to an aspect of the present disclosure. The switch assembly 1 has a housing 20 with a first region 20.1 and a second region 20.2. The regions 20.1, 20.2 are separated from one another by a partition 21. The magnet 14 is fastened to a first end 16.1 of the motor shaft 16 and is arranged with the stepper motor 12 in the first region 20.1 of the housing 20. The Hall sensor 15 is arranged in the second region 20.2, in the immediate vicinity of the magnet 14 but separated therefrom by the partition 21. The magnet 14 is always arranged such that the Hall sensor 15 can determine its position.

The control unit 10 and the motor driver 11 are also arranged in the second region 20.2 of the housing 20. The control unit 10 is connected to the stepper motor 12 via the motor driver 11.

The second end 16.2 of the motor shaft 16 is mechanically coupled to the on-load tap changer 17. The on-load tap changer 17 is actuated by actuation of the stepper motor 12.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Switch assembly
2 Control device
3 Drive system
4 Feedback system
5 Control unit
11 Motor driver
12 Stepper motor
13 Encoder system
14 Magnet
15 Hall sensor
16 Motor shaft
16.1 First end of the motor shaft
16.2 Second end of the motor shaft
17 On-load tap changer
20 Housing
20.1 First region
20.2 Second region
21 Partition

The invention claimed is:

1. A switch assembly comprising an on-load tap changer and a drive system for the on-load tap changer, the drive system comprising:
- a stepper motor having a motor shaft, the motor shaft being connected to and configured to actuate the on-load tap changer;
- a feedback system, which is configured:
  - to determine at least one value for a position of the motor shaft; and
  - to generate a feedback signal based on the at least one value; and
- a control device, which is configured to influence an operation of the switch assembly depending on the feedback signal,
- wherein the feedback system comprises a magnet and a Hall sensor, by which the at least one value for the position of the motor shaft is determined,
- wherein the switch assembly further comprises a housing having a partition,
- wherein the partition separates a first region from a second region of the housing, and
- wherein the stepper motor having the motor shaft and the magnet is arranged in the first region, and the Hall sensor is arranged in the second region.

2. The switch assembly as claimed in claim 1, wherein:
- the magnet is arranged on the motor shaft; and
- the Hall sensor is arranged in an immediate vicinity of the magnet such that a position of the magnet can be determined by the Hall sensor.

3. The switch assembly as claimed in claim 1, wherein:
- the magnet is arranged at a first end of the motor shaft; and
- the motor shaft is connected, at a second end that is situated opposite the first end, to the on-load tap changer.

4. The switch assembly as claimed in claim 1, wherein:
- the control device has a motor driver and a controller;
- the motor driver and the controller are configured to control the stepper motor and to actuate the on-load tap changer via the motor shaft.

5. The switch assembly as claimed in claim 1, wherein:
- the feedback system is connected to the control device.

6. The switch assembly as claimed in claim 1,
wherein when influencing the switch assembly, the control device is configured to do so by shutting down or deactivating the switch assembly.

7. The switch assembly as claimed in claim 1,
wherein when influencing the switch assembly, the control device is configured to do so by actuating the switch assembly again such that the on-load tap changer assumes or moves to a safe position or setting.

8. The switch assembly as claimed in claim 7, wherein:
the safe position or setting of the on-load tap changer corresponds to a position or setting of a selector of the on-load tap changer.

* * * * *